US008199915B2

(12) United States Patent
Shibasaki (10) Patent No.: US 8,199,915 B2
(45) Date of Patent: Jun. 12, 2012

(54) WIRELESS SYSTEM FOR ACTIVATION BY WIRELESS

(75) Inventor: Tomoki Shibasaki, Tokyo (JP)

(73) Assignee: Fujitsu Frontech Limited, Tokyo (JP)

( * ) Notice: Subject to any disclaimer, the term of this patent is extended or adjusted under 35 U.S.C. 154(b) by 1058 days.

(21) Appl. No.: 11/366,626

(22) Filed: Mar. 3, 2006

(65) Prior Publication Data

US 2007/0067422 A1     Mar. 22, 2007

(30) Foreign Application Priority Data

Sep. 20, 2005    (JP) .................................. 2005-272374
Dec. 27, 2005    (JP) .................................. 2005-375768

(51) Int. Cl.
     *H04K 1/00*      (2006.01)

(52) U.S. Cl. ..................... 380/270; 340/10.33; 709/220; 713/162; 713/324

(58) Field of Classification Search ................... 380/270; 709/220; 713/324, 162
See application file for complete search history.

(56) References Cited

U.S. PATENT DOCUMENTS

| 5,212,811 | A | * | 5/1993 | Kuge et al. ..................... 455/73 |
| 6,493,824 | B1 | * | 12/2002 | Novoa et al. .................. 713/162 |
| 6,526,507 | B1 | * | 2/2003 | Cromer et al. ................ 713/162 |
| 2004/0030895 | A1 | * | 2/2004 | Tachikawa .................... 713/168 |
| 2005/0047356 | A1 | * | 3/2005 | Fujii et al. .................... 370/311 |
| 2005/0143145 | A1 | * | 6/2005 | Maekawa ...................... 455/574 |
| 2005/0223111 | A1 | * | 10/2005 | Bhandaru et al. ............. 709/236 |
| 2005/0238172 | A1 | * | 10/2005 | Tamura ........................ 380/270 |
| 2006/0264227 | A1 | * | 11/2006 | Takahashi et al. ............ 455/513 |

FOREIGN PATENT DOCUMENTS

| JP | 10-164077 | 6/1998 |
| JP | 2003-87289 | 3/2003 |
| JP | 2004-72682 | 3/2004 |
| JP | 2005-73133 | 3/2005 |
| JP | 2005-244329 | 9/2005 |

OTHER PUBLICATIONS

"Design and implementation of IEEE 802.11i architecture for next generation WLAN" Bae et al; School of Electrical and Electronic Engineering, Chung-Ang University, 221, HukSuk-Dong, DongJak-Gu, Seoul, Korea, Republic of; Proceedings for Information Security and Cryptology—First SKLOIS Conference, CISC 2005, 2005 3822 LNCS/—(346-357) Publication.*

Japanese Office Action for Application No. 2005-375768; mailed Aug. 3, 2010.

* cited by examiner

*Primary Examiner* — Taghi Arani
*Assistant Examiner* — Jason Lee
(74) *Attorney, Agent, or Firm* — Staas & Halsey LLP (57) ABSTRACT

A wireless system realizes a WOL by including layers for switching security systems with a security level enhanced. The wireless system for activating a terminal through a radio base station from a remote area includes: a monitor device for monitoring the status of power supply of the terminal; and a security switch device for switching the security system of the terminal based on the status by switching to a fixed key security system when the status is changed to power-off and switching to a dynamic key security system when the status is changed to power-on.

12 Claims, 10 Drawing Sheets

BEACON FRAME

| order | INFORMATION |
|---|---|
| 1 | TIME STAMP |
| 2 | BEACON INTERVAL |
| 3 | CAPABILITY INFORMATION |
| 4 | SSID |
| 5 | SUPPORT RATE |
| 6 | FH PARAMETER SET |
| 7 | DS PARAMETER SET |
| 8 | CF PARAMETER SET |
| 9 | IBSS PARAMETER SET |
| 10 | TIM |
| 11 | ACTIVATION INFORMATION PERMISSION FLAG |
| 12 | ADDRESS INFORMATION |

AP ADDRESS REGISTRATION TABLE

| AP IDENTIFICATION NUMBER | ADDRESS |
|---|---|
| 1 | xx-xx-xx-xx-xx-xx |
| 2 | yy-yy-yy-yy-yy-yy |
| 3 | zz-zz-zz-zz-zz-zz |
| 4 | vv-vv-vv-vv-vv-vv |
| ⋮ | ⋮ |
| n | ww-ww-ww-ww-ww-ww |

WIRELESS SYSTEM FOR ACTIVATION BY WIRELESS

BACKGROUND OF THE INVENTION

1. Field of the Invention

The present invention relates to the security of a system capable of externally activating a device loaded with a radio, and more specifically to the technology of switching security at system shutdown.

2. Description of the Prior Art

Recently, a wireless system has been structured a number of techniques have been proposed to improve the convenience to a user. For example, there is the technique of activating a user PC by way of a LAN depending on the necessity from a remote area such as a WOL (wake up LAN), etc.

However, a technique such as a WOL, etc. is actually convenient, but it is very important to set a security technique to suppress the leak of the data during wireless communications. As a system using the WOL, a POS system (point of sales system) in a store, etc. is described below. Using the Internet, etc. from a remote area (user home), a PC of a head office is accessed, a POS terminal (register for POS of a client) is activated through an AP (access point of a radio base station), price information, etc. is acquired from the head office, and the database of the POS terminal is updated. These operations are normally performed before opening a store each day, and updating a database takes a long time. Therefore, it is necessary to power up a POS terminal in advance through a WOL. When a database is updated, important data such as price information, etc. can be disclosed. Therefore, the encryption is required.

The patent documents 1 through 3 offer the propositions to improve the security against the leakage of data of a system using a wireless LAN such as a communication system for improving the security using a dynamic key and authentication data, a switch system as to whether or not encryption is to be performed, etc.

However, in the common wireless communication, when encryption is performed to ensure security, an encryption key is fixed if a WOL is used. For example, a WEP (wired equivalent privacy) is used. However, the system using a fixed key such as the WEP, etc. is less reliable than a system using a dynamic key. Therefore, it is considered to use a TKIP (temporal key integrity protocol) and an AES (advanced encryption standard) using a dynamic key. However, since an encryption key is dynamically changed in a high-level encryption system, a WOL cannot be easily realized. For example, since the same encryption key is to be used at the activation and termination, it is necessary to change the hardware and develop a dedicated driver.

In the patent documents 1 through 3, the communication system after the activation of a POS terminal is described, but they do not describe the system capable of entering an operation status without reducing the security level after the activation using a WOL.

[Patent Document 1] Japanese Published Patent Application No. 2004-72682

[Patent Document 2] Japanese Published Patent Application No. 2003-87289

[Patent Document 3] Japanese Published Patent Application No. 2005-73133

SUMMARY OF THE INVENTION

The present invention aims at providing a program of a wireless system for realizing a WOL by providing an OS, layers, etc. for switching a security system between a radio driver layer and an application layer of a terminal (a POS terminal, etc.) connected to the wireless system, and enhancing a security level.

An aspect of the present invention is a wireless system which activates a terminal through a radio base station from a remote area, and includes: a monitor device for monitoring the status of power supply of the terminal; and a security switch device for switching the security system of the terminal based on the status by switching to a fixed key security system when the status is changed to power-off and switching to a dynamic key security system when the status is changed to power-on.

The radio base station can be configured to be switched to the security system corresponding to a VLAN function, to the communication of the VLAN for a fixed key security system when the status is changed to power-off, and to the communication of the VLAN for a dynamic key security system when the status is changed to power-on.

The radio base station can also be configured to transmit an activation information permission flag and the address information about the terminal to the terminal together with a beacon frame when the terminal is activated by a beacon and when the station receives an activation instruction to the terminal which is activated from the remote area.

The terminal can also be configured to switch the communication in the order of a higher priority for switching the radio base station recorded in the terminal when communication cannot be established with a predetermined first radio base station.

It is preferable that the radio base station can be configured to switch a communication system by the communication system switch function for switch to the communication by a fixed key security system when the status is changed to power-off, and for switch to the communication by a dynamic key security system when the status is changed to power-on.

Another aspect of the present invention is a computer-readable recording medium storing a program of a wireless system to activate a terminal from a remote area through the radio base station to be used to direct a computer to perform: a monitoring function of monitoring the status of power supply of the terminal; and a security switching function of switching the security system of the terminal based on the status by switching to a fixed key security system when the status is changed to power-off and switching to a dynamic key security system when the status is changed to power-on.

The radio base station can perform the processes of switching the communication function using the VLAN function, switching for communications in the fixed key security system when the status is changed to power-off, and switching for communications in the dynamic key security system when the status is changed to power-on.

Additionally, when the terminal is activated using a beacon, the radio base station can perform the process of transmitting the activation information permission flag and the address information about the terminal to the terminal with a beacon frame.

Furthermore, when the terminal cannot communicate with a predetermined first radio base station, the communication can be switched based on the switch priority of the radio base station.

It is preferable that the radio base station can perform the process of switching a communication system by the communication system switch function for switch to the communication by a fixed key security system when the status is changed to power-off, and for switch to the communication by a dynamic key security system when the status is changed to power-on.

With the above-mentioned configuration, a WOL can be realized even using a high-level security system.

According to the present invention, operations can be flexibly performed independent of the security system by controlling the switch among existing hardware, radio driver, radio base station, etc. Furthermore, a new security system can be easily operated.

DESCRIPTION OF THE PREFERRED EMBODIMENTS

An embodiment of the present invention is described below in detail by referring to the attached drawings.

Embodiment 1

Figure 1:
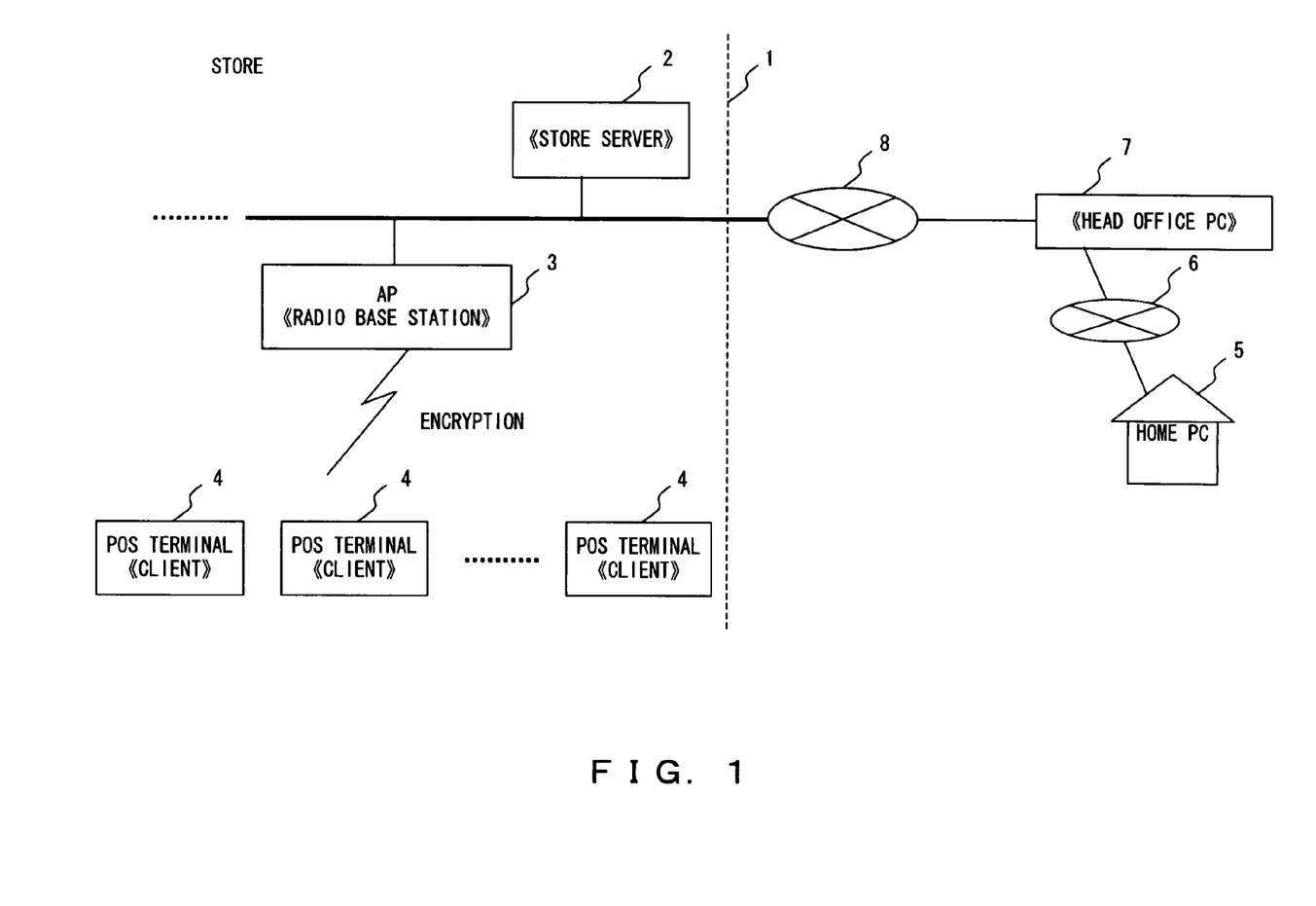
FIG. 1 shows the system configuration of the present invention.

FIG. 1 shows the configuration of the system structured using radio equipment. A wireless system in a store 1 is configured by a store server 2, an AP 3 (radio base station), a POS terminal 4 (terminal of a client), etc. The store server 2 is connected to a plurality of POS terminals 4 in the store through the AP 3, etc. A plurality of APs 3 are radio base stations provided for communicating data with the POS terminal 4. This system is remotely operated from a home PC 5 to realizing a WOL, and accesses a head office PC 7 through the Internet 6, etc. The head office PC 7 transmits data for activation of the POS terminal 4 via a circuit such as a WAN 8, etc. After the activation of the POS terminal 4, the head office PC 7 transmits the price information, etc. about the goods of the day to the POS terminal 4, and updates the database of the memory of the POS terminal 4.

Figure 2:
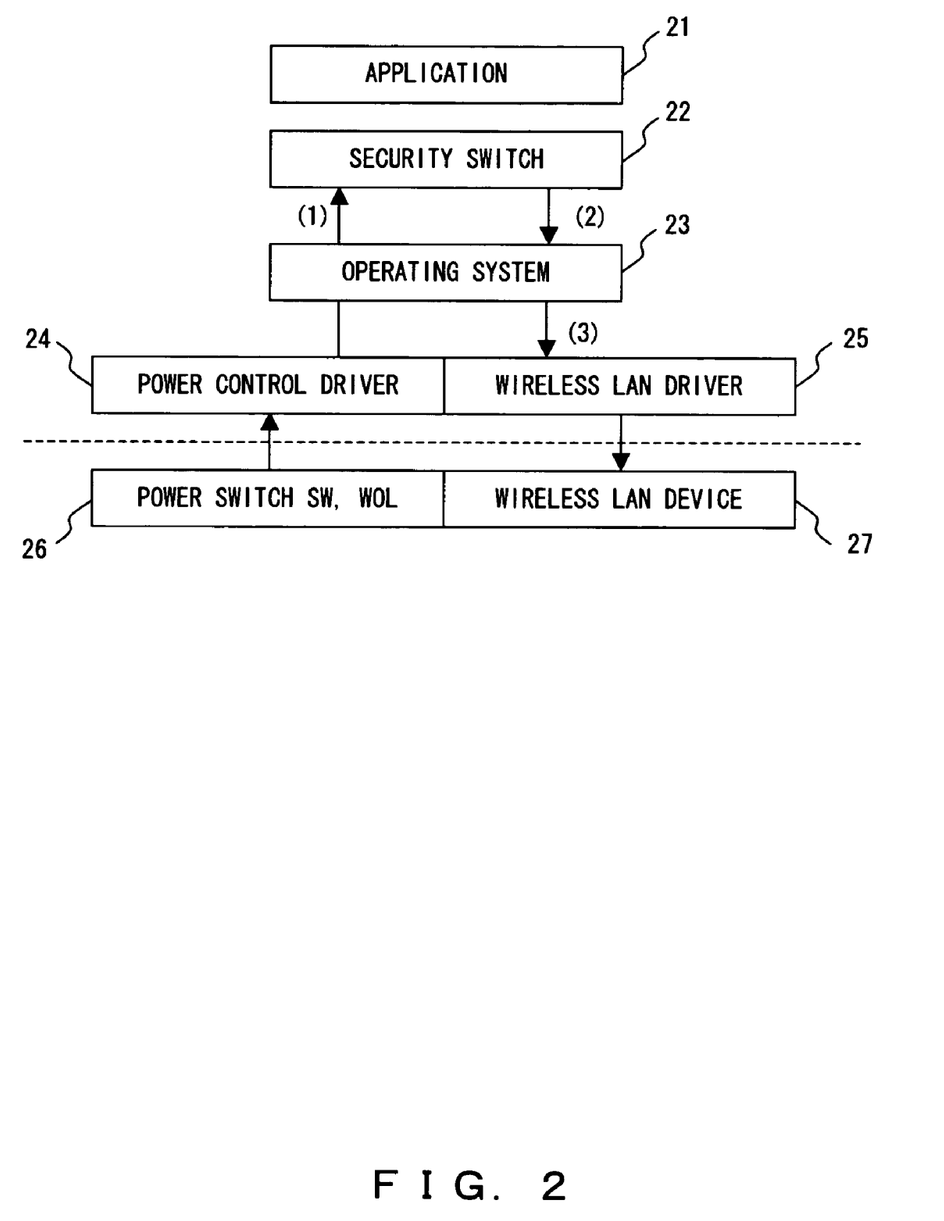
FIG. 2 shows the system structure of a POS terminal.

FIG. 2 shows the system configuration of the POS terminal according to the present invention. The system is configured by layers such as an application 21, a security switch 22, an operating system 23, a power control driver 24, a wireless LAN driver 25, etc.

The application 21 is an application such as a register, etc. In the present embodiment, it is operated by the POS terminal 4 provided in the store.

The security switch 22 controls the switch of the security system after the activation by a WOL. The security switch 22 is not limited to the configuration according to the present embodiment, but can be provided in the application 21, or in the power control driver 24, or the wireless LAN driver 25. The operating system 23 is to control the operation of the POS terminal 4.

The power control driver 24 and the wireless LAN driver 25 are to control the hardware of the POS terminal 4.

The power control driver 24 controls the power switch SW, WOL shown in FIG. 2. It controls the WOL in which the power switch is turned on and the POS terminal 4 is activated, the power on/off of the normal power supply, etc.

The wireless LAN driver controls, for example, the wireless LAN 802.11 standard, etc., and controls the hardware of the wireless LAN such as a wireless LAN device 27 shown in FIG. 2. It is also a driver for controlling the security system such as the WEP, TKIP, AES, etc.

Described below is the arrows shown in FIG. 2. The arrow (1) passes the status of the power supply of the POS terminal 4 of the POS terminal 4 from a power switch SW, WOL 26 to the security switch 22 through the power control driver 24 and the operating system 23. The types of the status can be the status information including at least "during boot-up", "during operation", "during shutdown", etc.

The arrow (2) switches from the fixed key security system to the dynamic key security system when the status "during boot-up" changes to "during operation". In addition, before the status changes to "during shutdown", it switches from the dynamic key security system to the fixed key security system. In this example, a notification about the switch is issued to the application 21.

Then, the arrow (3) notifies the radio driver of the switch of the security system (security mode). Through the notification, the hardware of the 27 is switched to the security system corresponding to the notification contents.

Figure 3:
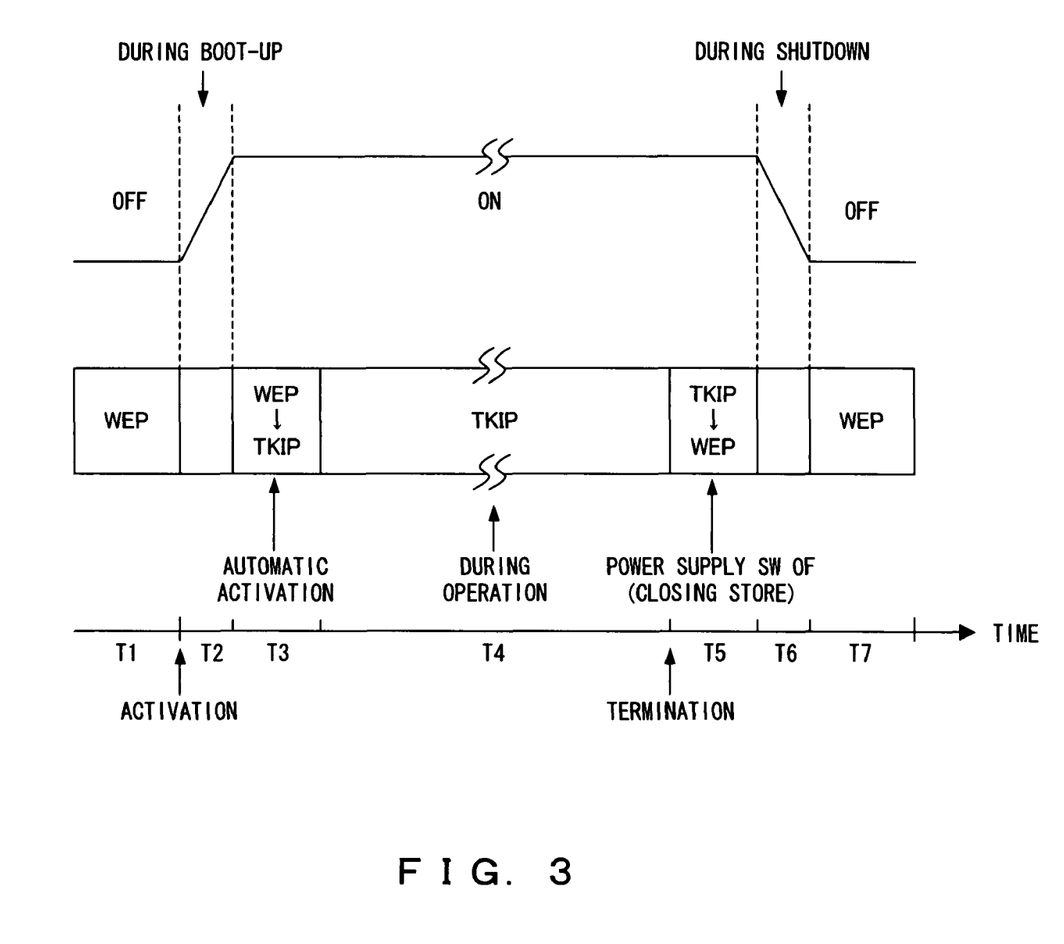
FIG. 3 is a time chart showing the switch of the security system.

The above-mentioned operation is explained below by referring to the time chart shown in FIG. 3. The period indicated by T1 shown in FIG. 3 is changed to the status of the power-off of the POS terminal 4. The security system at this time is the WEP using a fixed key. An instruction to activate the POS terminal 4 is transmitted by the WOL from the remote area. The POS terminal 4 enters the status of "during activation" according to the arrow (activation) shown in FIG. 3. The transmitted activation signal continuously transmits a MAC address, etc. in a packet format, and activation can also be performed by continuously receiving the signal at a predetermined frequency.

Next, in the period of T2, the status of "during boot-up" is entered. In the period of T3, the security system is changed from the fixed key system to the dynamic key system. This example shows a change from the WEP to the TKIP, but the present invention is not limited to this specification.

In the period of T4, a dynamic key security system such as the TKIP is operated. In the period of T5, the operation of powering off is detected, and the TKIP is changed to the WEP. Then, in the period of T6 indicating the system shutdown, the status information is switched to the status of "during shutdown", and the POS terminal 4 is turned off. Thus, the dynamic key security system is used in in normal operation, and the fixed key security system such as the WEP, etc. is used in the WOL, thereby realizing the WOL environment with high-level security.

Figure 4:
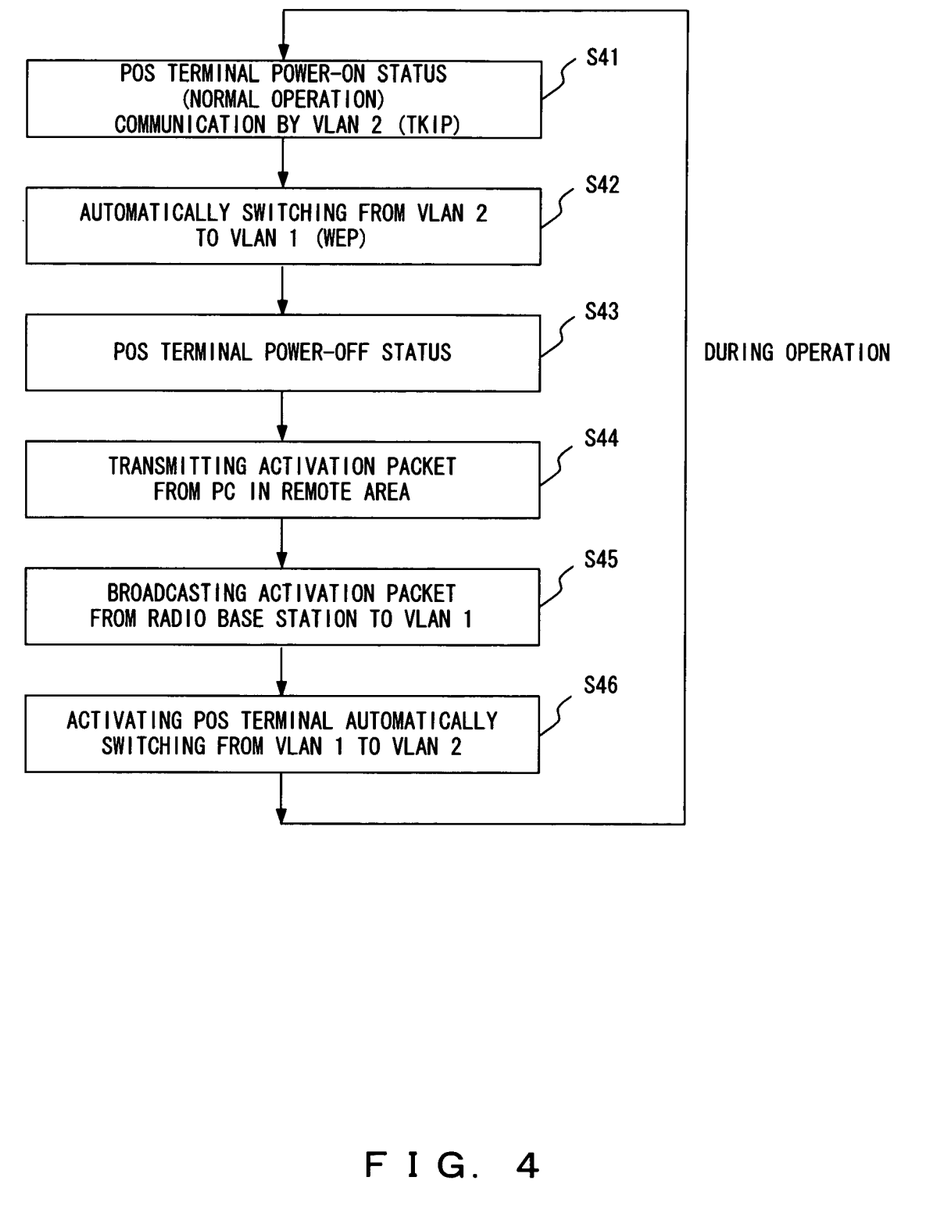
FIG. 4 is a flowchart of the operations of the system.

FIG. 4 is a flowchart of the operation of a wireless system. The AP 3 uses, for example, a VLAN function (virtual LAN), and prepares an environment in which a radio base station can use two types of security. By setting a radio base station capable of using the VLAN, the ID of the VLAN for WOL and operation is set. For example, the VLAN 1 is set as WEP exclusively for the WOL, and the VLAN 2 is set as TKIP exclusively for the operation.

Then, the function and the system for switching the VLAN of the connected AP 3 are added to the POS terminal 4.

In step S41, the operation terminates with the POS terminal 4 set in the power-on status (normal operation)/VLAN 2 (TKIP) (arrow shown in FIG. 3 (terminate)).

In step S42, the VLAN 2 is automatically switched to the VLAN 1 according to the switch signal received from the POS terminal 4.

In step S43, the POS terminal 4 is powered off (in the periods of T7 and T1 shown in FIG. 3).

In step S44, an activation packet is transmitted from the PC in a remote area (user home, etc.)

In step S45, the AP 3 transmits an activation packet to the VLAN 1 in a broadcast.

In step S46, the POS terminal 4 is activated by the arrow (activation) shown in FIG. 3 (in the period of T2 shown in FIG. 3). The switch is automatically made from the VLAN 1 to the VLAN 2 (in the period of T3 shown in FIG. 3). In this example, the activation packet receives a packet containing MAC address continuous n times, and the network controller turns on the POS terminal 4.

With the above-mentioned configuration, existing hardware can be used, and the system can be realized by adding simple control only. Furthermore, it can be flexibly operated also in a new future security system.

Embodiment 2

Figure 5:
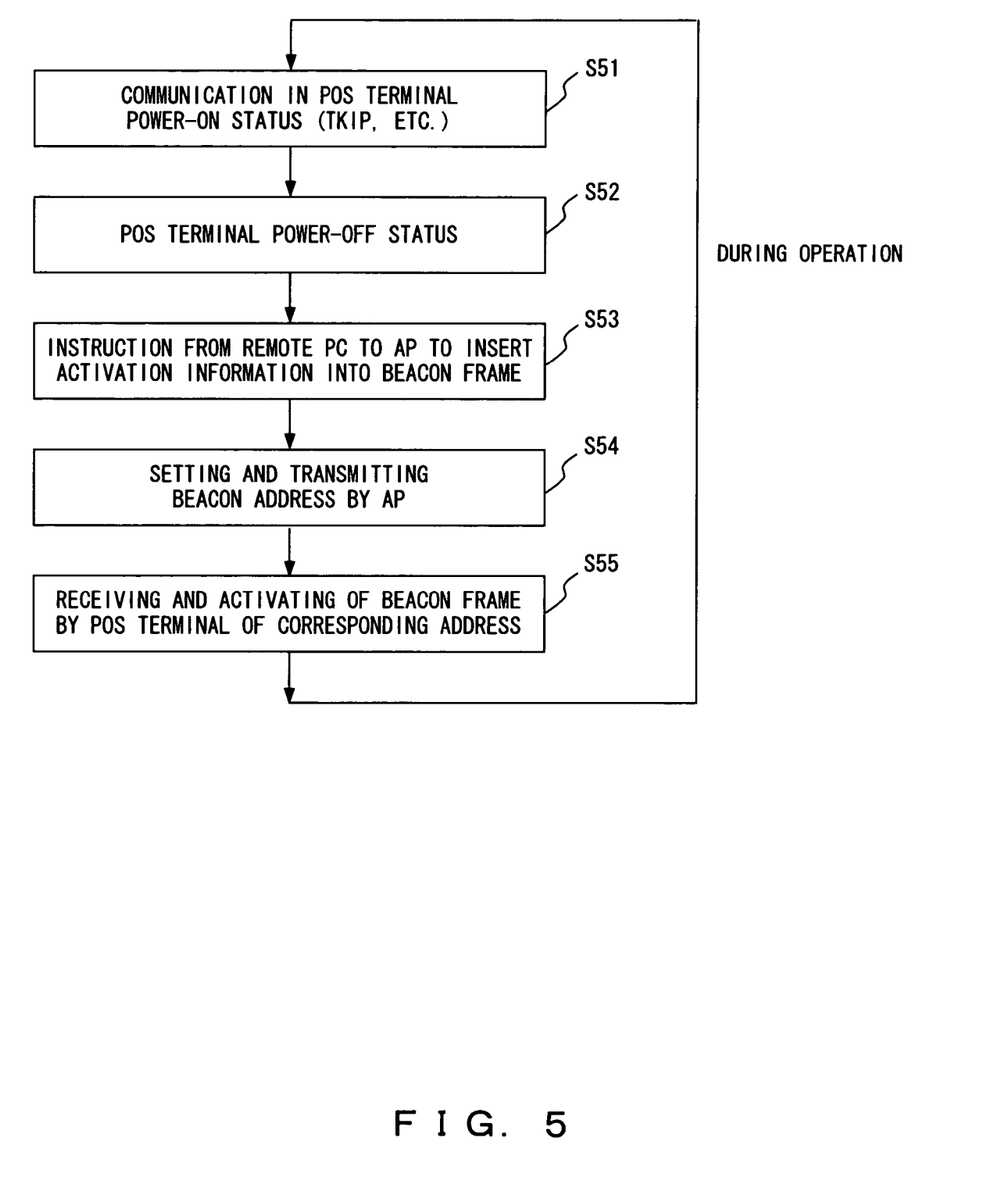
FIG. 5 is a flowchart of the operations of the system when a beacon is used.

FIG. 5 is a flowchart of the wireless system using a beacon frame.

Since a beacon frame is a frame which is not encrypted and transmitted from a radio base station to all clients in a broadcast at predetermined intervals, a WOL can be realized using the beacon frame.

In the embodiment 1, an activation packet is encrypted. In the present embodiment, information functioning as an activation packet is inserted into a beacon frame.

A beacon frame is a frame for use in notifying a peripheral radio station (the POS terminal 4 in this embodiment) of necessary information for wireless communications. In the present embodiment, a beacon frame is constantly transmitted from a radio base station (the AP 3 in this embodiment).

When a WOL is realized using a beacon frame, it is necessary to prepare communication for a normal operation and a wireless LAN exclusively for the WOL.

In step S51, the power of the POS terminal 4 is ON. At this time, as in the embodiment 1, the dynamic key security system is applied.

In step S52, for example, it is the closing time for the store, and the POS terminal 4 is turned off.

In step S53, the PC 5 located in the remote area (user home, etc.) issues an instruction to the AP 3 before opening the store to insert into the beacon frame the information (activation information described later) necessary for activating the WOL.

Figure 6:
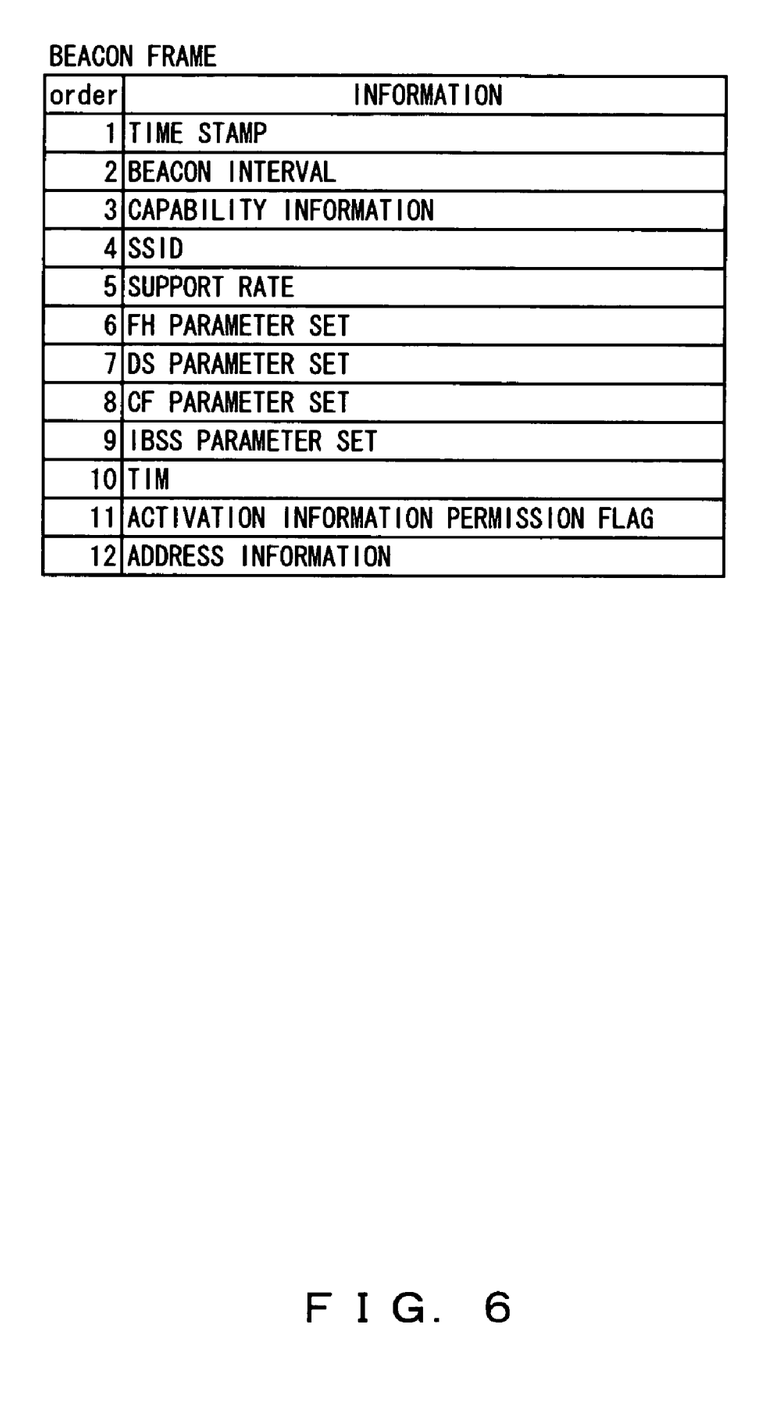
FIG. 6 shows the frame configuration of a beacon according to the embodiment 2.

In step S54, the AP 3 sets the activation information in the beacon frame, and transmits the information to the POS terminal 4. A beacon frame is explained below. FIG. 6 shows the structure of a beacon frame. A beacon frame is normally configured by a time stamp, a beacon interval, capability information, SSID (ESSID), a support rate, an FH parameter set, a DS parameter set, a CF parameter set, an IBSS parameter, a TIM, etc. In the present embodiment, the configuration further includes an activation information permission flag, and address information. Described below are an activation information permission flag and address information. The explanation of other components is omitted here.

An activation information permission flag is a flag for setting from the home PC 5 to the AP 3 whether or not the POS terminal 4 is to be activated through the WOL. The flag is to be at least 1 bit in width. The address information is prepared such that by setting a MAC address it can be transmitted to the POS terminal 4. The address information is not limited to the MAC address. That is, an address identifying the POS terminal 4 with which the AP 3 communicates can be used.

In step S55, when the POS terminal 4 receives a beacon frame, and it is the address information, the terminal is activated. Since a beacon frame is transmitted at predetermined intervals, it can be a trigger for activation when the same address information is received plural times.

After the activation, the status in step S51 is entered and the operation status is continued.

For example, the VLAN function explained according to the embodiment 1 can be used.

Embodiment 3

When the WOL function is used, the POS terminal POS terminal 4 cannot be activated when the AP 3 (radio base station) is switched. Therefore, the POS terminal 4 responds to the activation packet only from the AP 3 connected immediately before power-off.

When the POS terminal 4 is moved or a radio base station is powered off, the activation cannot be performed by the WOL.

Figure 7:
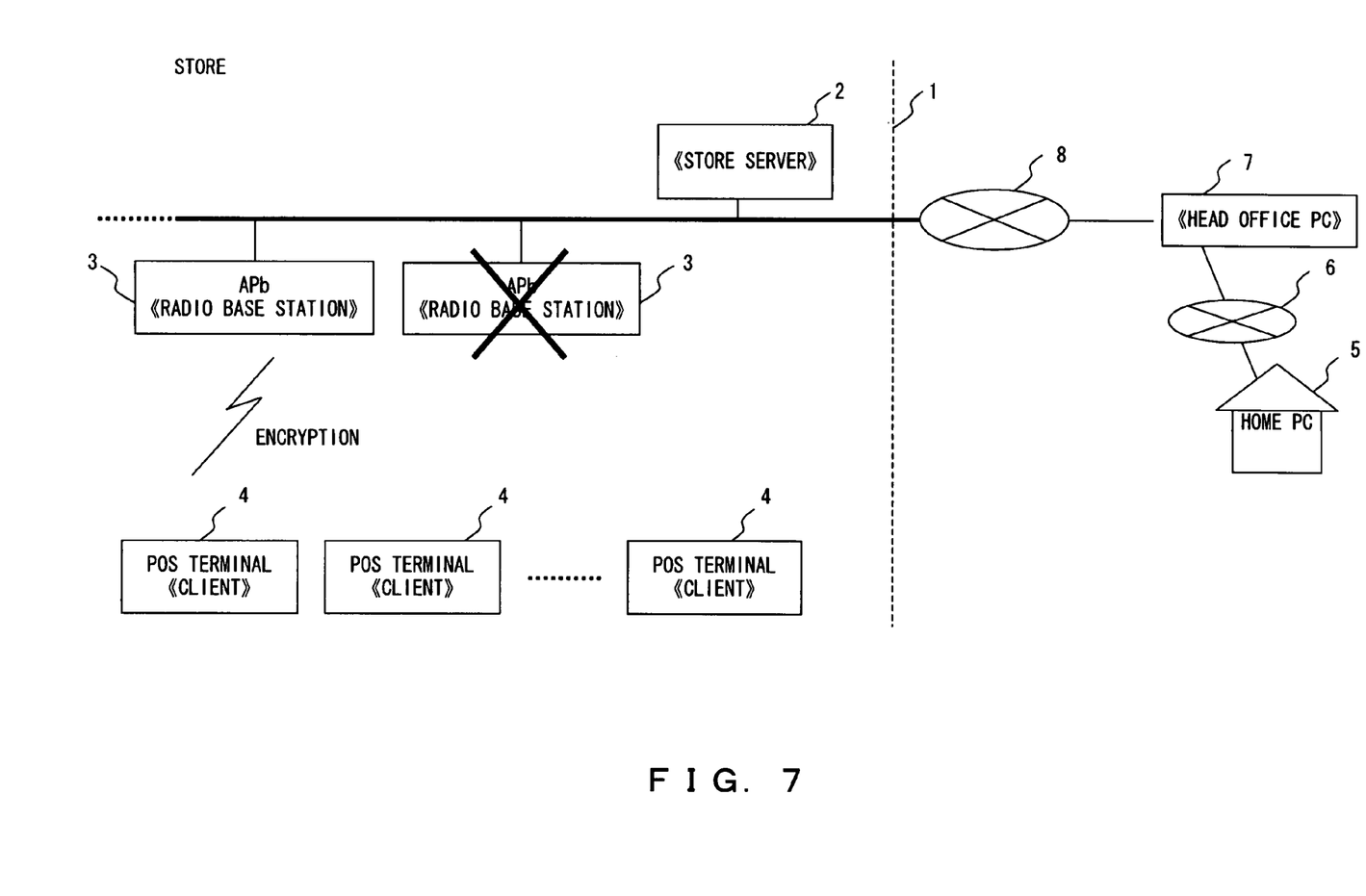
FIG. 7 shows the configuration according to the embodiment 3.

FIG. 7 shows the configuration of a wireless system. For example, assume that there are two APs 3. Assuming that radio base stations APa and APb are arranged, and the APa cannot perform communications in an accident, the POS terminal 4 cannot communicate with the APa, and accordingly the activation through the WOL cannot be performed. Therefore, the APb is registered in addition to the APa already registered in the POS terminal 4.

Figure 8:
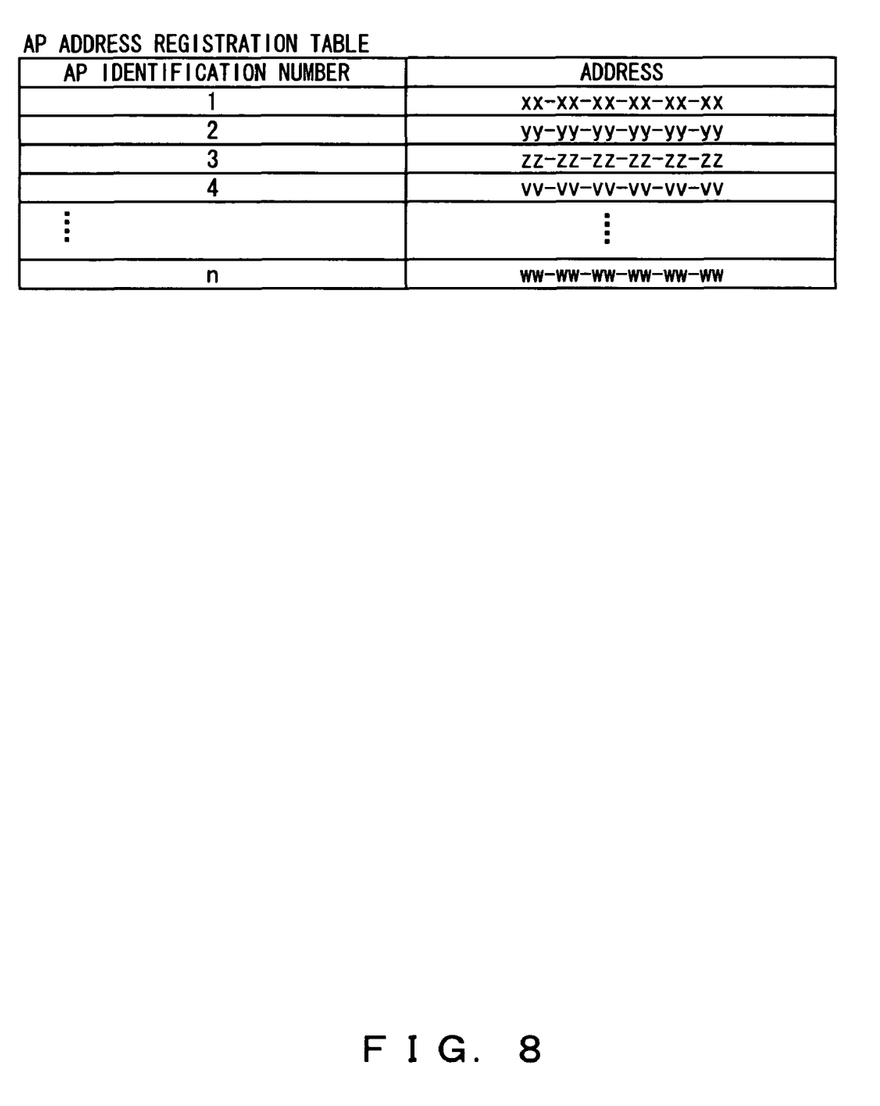
FIG. 8 is an address registration table of an AP.

FIG. 8 shows an AP address registration table recorded in the memory of the POS terminal 4. The AP registration table records at least an AP identification number and address information. The AP identification number can be, for example, an alphabetical character such as a, b, ..., etc., or an integer of 1 through n (n is an integer). A registered number is assigned a priority in the registration order.

The address information can be information according to which the address of the AP 3 can be identified like a MAC address. In this embodiment, it is indicated by xx-xx-xx-xx-xx-xx, ... ww-ww-ww-ww-ww-ww, etc.

With the above-mentioned configuration, the activation can be performed using the WOL in response to the activation signal from the APb. The activation condition is that there is no transmission from the APa, and the transmission is continuously performed from the APb.

For example, when the APa becomes faulty, a POS terminal switches a registration table by the trigger of stopping the beacon frame of the APa, and responds to the switch signal from the APb.

At this time, the same channels are assigned to the APa and the APb, and when different channels are assigned, the APb allows all channels to issue an activation signal When the APa becomes faulty, a POS terminal switches a registration table by the trigger of stopping the beacon frame of the APa, the POS terminal is automatically activated, connected again to the APb, and automatically turned off, thereby activating the APb. At this time, the association with the WOL is automatically changed from the APa to the APb. The example of beacon frame is described above, but any example of detecting the stop of the communication can be adopted. A timeout, etc. can be detected for switch by a base station.

Embodiment 4

The embodiment 4 is described below by referring to the time chart shown in FIG. 3. The embodiment 5 shows an example of simultaneously switching the security system and the communication system.

The period indicated by T1 shown in FIG. 3 is changed to the status of the power-off of the POS terminal 4. The security system at this time is the WEP using a fixed key. An instruction to activate the POS terminal 4 is transmitted by the WOL from the remote area. The POS terminal 4 enters the status of "during activation" according to the arrow (activation) shown in FIG. 3. The transmitted activation signal continuously transmits a MAC address, etc. in a packet format, and activation can also be performed by continuously receiving the signal at a predetermined frequency.

Next, in the period of T2, the status of "during boot-up" is entered. In the period of T3, the security system is changed from the fixed key system to the dynamic key system. This example shows a change from the WEP to the TKIP, but the present invention is not limited to this specification.

In the period of T4, a dynamic key security system such as the TKIP is operated. In the period of T5, the operation of powering off is detected, and the TKIP is changed to the WEP. Then, in the period of T6 indicating the system shutdown, the status information is switched to the status of "during shutdown", and the POS terminal 4 is turned off. Thus, the dynamic key security system is used in in normal operation, and the fixed key security system such as the WEP, etc. is used in the WOL, thereby realizing the WOL environment with high-level security.

Figure 9:
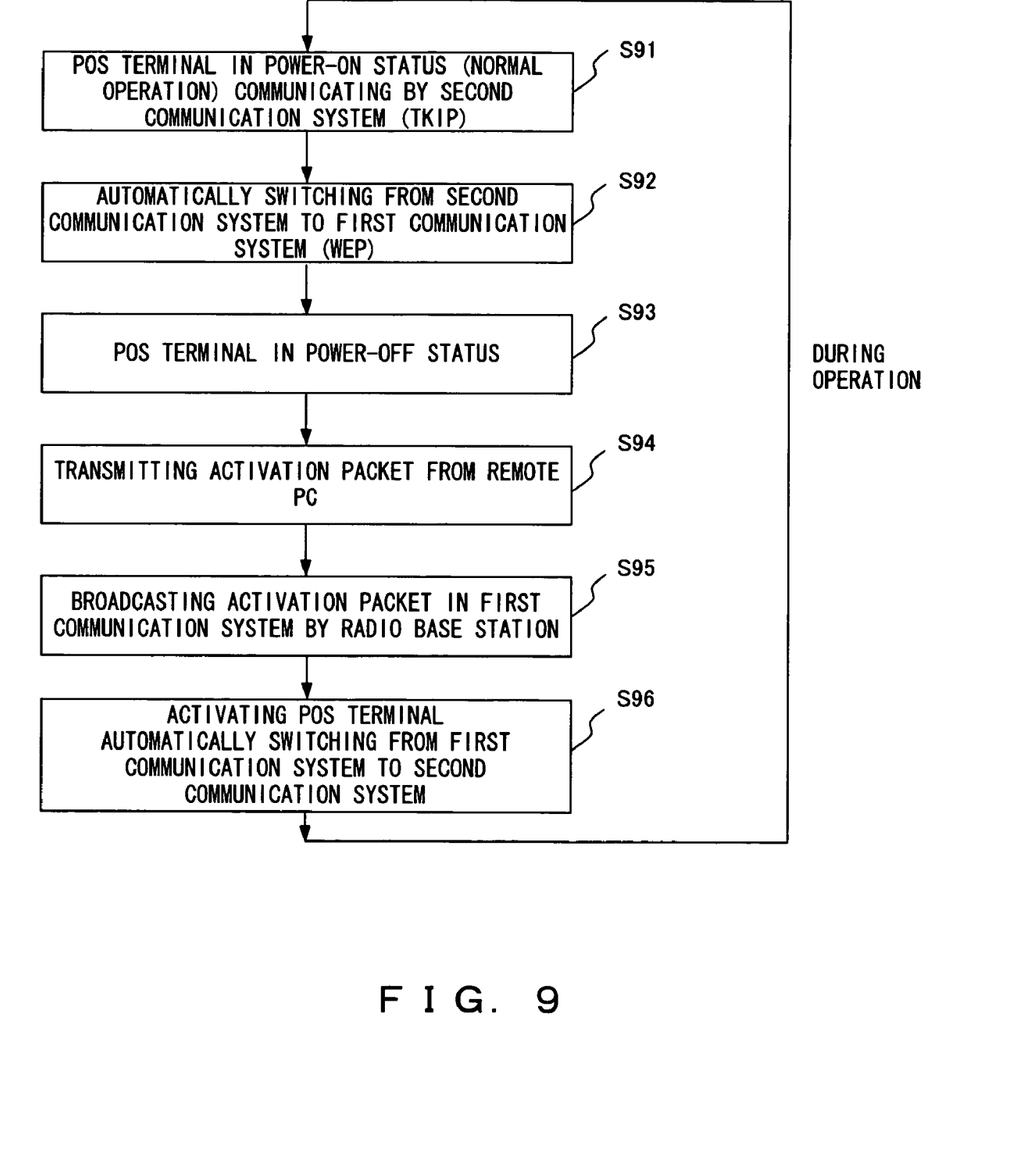
FIG. 9 is a flowchart of showing the operation of the system by switching the communication system.

FIG. 9 is a flowchart of the operation of a wireless system. The AP 3 uses, for example, a VLAN function (virtual LAN), and prepares an environment in which a radio base station can use two types of security. The radio base station can use two or more communication systems. The communication systems for the WOL and the normal operation, and an ID are set. For example, the first communication system is set for the WEP as a dedicated system for the WOL, and the second communication system is set for the TKIP as a dedicated system for the normal operation.

Then, the function and system of switching the communication system of the AP3 to be connected is added to the POS terminal 4. The communication system is not specified, but in the present embodiment, a radio base station and a POS terminal capable of switching to the standard such as the wireless LAN standard IEEE 802.11a, b, g, etc. is described.

In step S91, the operation is terminated in the power-on status of the POS terminal 4 (normal operation)/second communication system (wireless LAN standard 802.11b) (TKIP) (arrow shown in FIG. 3 (end)).

In step S92, the system is automatically switched from the second communication system to the first communication system (wireless LAN standard 802.11a) according to the switch signal received from the POS terminal 4.

In step S93, the POS terminal 4 is turned to the power-off status (during the period of T7 and T1 shown in FIG. 3).

In step S94, an activation packet is transmitted from the PC in a remote area (home, etc.).

In step S95, the AP3 broadcasts an activation packet in the first communication system.

In step S96, the POS terminal 4 is activated as indicated by the arrow (activation) shown in FIG. 3 (during the period of T2 shown in FIG. 3). The system is automatically switched from the first communication system to the second communication system (during the period of T3 shown in FIG. 3). For example, relating to the activation packet, a packet including n continuous MAC addresses is received, and the network controller turns on the POS terminal 4.

With the configuration, as compared with the configuration by the VLAN which is in the embodiment 1, it is not necessary to provide equipment such as a switching hub, etc., thereby requiring no equipment in additional to the existing hardware, and realizing the system only by adding simple control. Furthermore, a new security system can be flexibly available.

The present embodiment can also be realized by generating a flow shown in the above-mentioned embodiments 1 through 4 as a control program used to direct the CPU of a standard computer, recording the program in a computer-readable recording medium, and allowing the program to be read by a computer from the recording medium and executed by the CPU.

Figure 10:
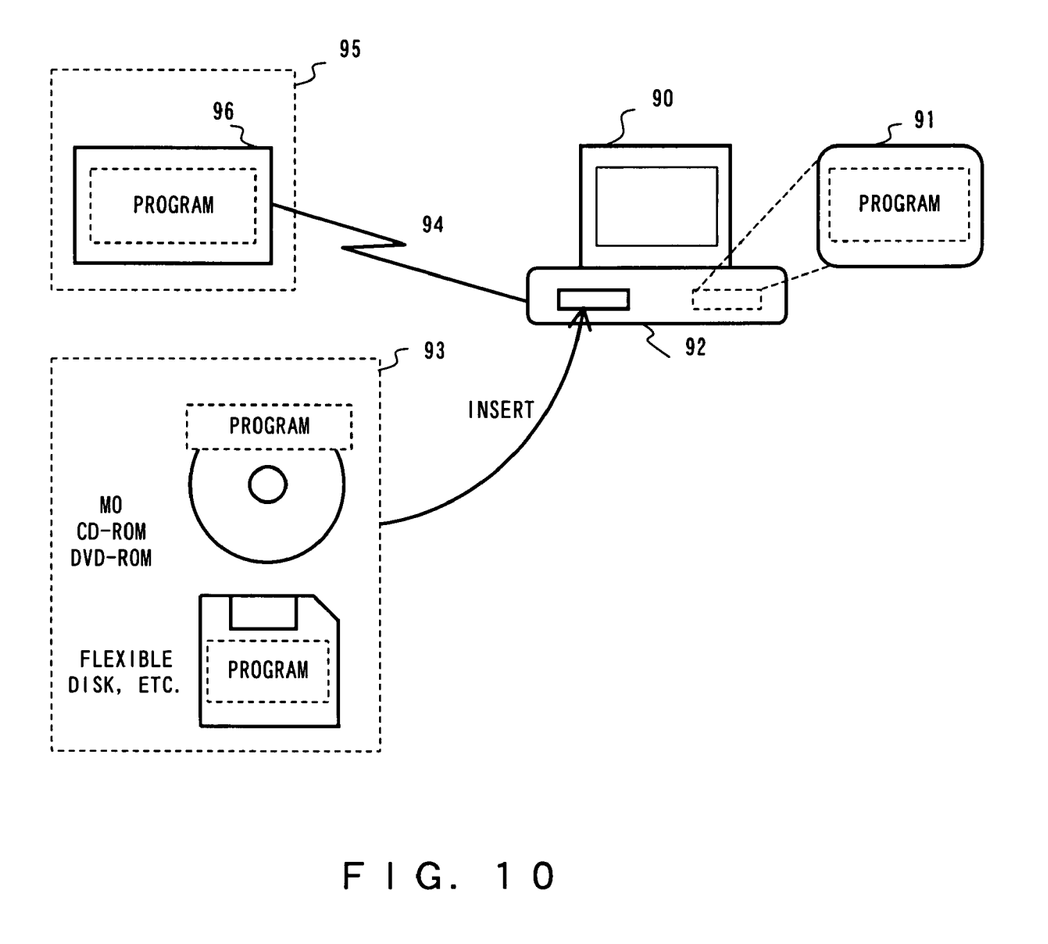
FIG. 10 shows recording a program of a wireless system.

FIG. 10 shows an example of a recording medium storing a control program which can be read by a computer system. The recording medium can be a storage device 91 such as ROM, a hard disk, etc. provided as a built-in or external accessory device to a 90, a portable recording medium 93 such as a flexible disk, an MO (magneto optical disk), CD-ROM, DVD-ROM, etc. for reading the control program recorded by insertion into a medium drive device 92 provided for the computer system 90.

The recording medium can also be a storage device 96 provided by a computer system functioning as a program server 95, and can be connected to the computer system 90 via a communication circuit 94. In this case, the transmission signal obtained by modulating a carrier wave by a data signal representing a control program is transmitted to the computer system 90 through the communication circuit 94 as a transmission medium from the program server 95, the computer system 90 demodulates the received transmission signal, and the control program is regenerated, thereby executing the control program by the CPU of the computer system 90.

Furthermore, the present invention is not limited to the above-mentioned embodiments, but various improvements and variations can be realized within the gist of the present invention.

What is claimed is:

1. A wireless system which activates terminals from a remote area by broadcasting activation information from a radio base station, the terminals respectively comprising:
   a power supply with a power switch activated when the terminal receives, by using a fixed key security system, activation information including same address information indicating a same address as an address of the terminal from the radio base station a predetermined number of times while a status of the power supply is power-off;
   a monitor device monitoring the status of the power supply of the terminal; and
   a security switch device switching the security system of the terminal from a dynamic key security system to the fixed key security system when the status of the power supply is changed to power-off and switching the security system of the terminal from the fixed key security system to the dynamic key security system when the status of the power supply is changed to power-on as the activation information including the same address information indicating the same address as the address of the terminal is received, by using the fixed key security system, from the radio base station the predetermined number of times.

2. The wireless system according to claim 1, wherein the radio base station is switched to the security system corresponding to a VLAN function, to the communication of the VLAN for a fixed key security system when the status is changed to power-off, and to the communication of the VLAN for a dynamic key security system when the status is changed to power-on.

3. The wireless system according to claim 1, wherein the radio base station transmits an activation information permission flag and address information about the terminal to the terminal together with a beacon frame when the terminal is activated by a beacon and when the station receives an activation instruction to the terminal which is activated from the remote area.

4. The wireless system according to claim 1, wherein the terminal switches communications with another radio base station different than the radio base station in an order of a higher priority which is for switching the radio base station and is recorded in the terminal when communication cannot be established with the radio base station.

5. The wireless system according to claim 1, wherein the fixed key is a WEP.

6. The wireless system according to claim 1, wherein the dynamic key is a TKIP.

7. The wireless system according to claim 1, wherein the dynamic key is an AES.

8. The wireless system according to claim 1, wherein the address information is a MAC address.

9. A computer-readable recording medium storing a program of a terminal in a wireless system activating terminals from a remote area by broadcasting activation information from a radio base station to the terminals, the program, when executed by a computer, causing the computer to perform a method comprising:

monitoring a status of a power supply of the terminal;

switching a security system of the terminal from a dynamic key security system to a fixed key security system when the status of the power supply is changed to power-off;

activating the terminal when the terminal receives, by using the fixed key security system, activation information including same address information indicating a same address as an address of the terminal from the radio base station a predetermined number of times when the status of the power supply is power-off; and switching the security system of the terminal from the fixed key security system to the dynamic key security system when the status of the power supply is changed to power-on as activation information including the same address information indicating the same address as the address of the terminal is received, by using the fixed key security system, from the radio base station the predetermined number of times.

10. The computer-readable recording medium according to claim 9, wherein the radio base station is switched to the security system corresponding to a VLAN function, to the communication of the VLAN for a fixed key security system when the status is changed to power-off, and to the communication of the VLAN for a dynamic key security system when the status is changed to power-on.

11. The computer-readable recording medium according to claim 9, wherein the radio base station transmits an activation information permission flag and address information about the terminal to the terminal together with a beacon frame when the terminal is activated by a beacon and when the station receives an activation instruction to the terminal which is activated from the remote area.

12. The computer-readable recording medium according to claim 9, wherein the terminal switches communications with another radio base station different than the radio base station in an order of a higher priority which is for switching the radio base station and is recorded in the terminal when communication cannot be established with the radio base station.

* * * * *